United States Patent [19]
Piroozmandi

[11] Patent Number: 5,770,823
[45] Date of Patent: Jun. 23, 1998

[54] ZERO HEIGHT LOAD MEASURING SYSTEM AND METHOD OF INSTALLING SAME

[75] Inventor: Farid Piroozmandi, Bothell, Wash.

[73] Assignee: Kistler-Morse Corporation, Bothell, Wash.

[21] Appl. No.: 632,587

[22] Filed: Apr. 15, 1996

[51] Int. Cl.[6] .......................... G01G 9/00; G01G 19/52; G01G 19/02

[52] U.S. Cl. ...................... 177/1; 177/132; 177/144; 177/146

[58] Field of Search ................. 177/1, 132, 133, 177/141, 142, 144, 146

[56] References Cited

U.S. PATENT DOCUMENTS

| | | | |
|---|---|---|---|
| 4,589,507 | 5/1986 | Curran | 177/138 |
| 4,889,202 | 12/1989 | Bron | 177/134 |
| 5,257,668 | 11/1993 | Sargent et al. | 177/146 |

Primary Examiner—Michael L. Gellner
Assistant Examiner—Randy W. Gibson
Attorney, Agent, or Firm—Seed & Berry LLP

[57] ABSTRACT

A load measuring system specially adapted for installation on the support legs of existing storage vessels. The load measuring system includes an attachment plate that is fastened to each support leg of the vessel, a support plate that is mounted on anchor bolts projecting upwardly from the supporting surface, and a load cell positioned between the attachment plate and the support plate. The support plate is supported by nuts threaded on respective anchor bolts. The nuts are rotated to raise the lower ends of the support legs above the supporting surface, thereby transferring the portion of the vessel's weight carried by the support leg to the load measuring system. The space between the support plate and the supporting surface is then filled with a supporting material such as concrete.

20 Claims, 6 Drawing Sheets

ZERO HEIGHT LOAD MEASURING SYSTEM AND METHOD OF INSTALLING SAME

TECHNICAL FIELD

This invention relates to load measuring systems, and more specifically to a load measuring system that can be installed under an existing storage vessel without modifying either the position of the vessel or its inlet and outlet conduits.

BACKGROUND OF THE INVENTION

A manufacturer of bulk material generally wants to keep track of the amount of goods contained in a storage vessel, and/or accurately measure the amounts of different ingredients that are introduced into a batch mixture of his product that are mixed together in a large bin or silo. A number of conventional techniques have been used for this purpose. For example, level measuring devices using various technologies have been used. Some of these level measuring devices, such as "plumb bobs," are mechanical, while others, such as capacity probes, ultrasound ranging systems, and microwave ranging systems, are electric.

One advantage of the above-described level measuring devices is that they can all be installed without altering the position of the vessel or extensively modifying its structure. However, none of these conventional devices provides very accurate information about the weight of the material in the vessel since the material density can change because of several factors, such as the collection of moisture by the material, compaction of the material, and rat holing and bridging of material in a vessel. Another problem with conventional level measuring devices is that, since they are installed inside the vessel, they can come in contact with the material stored in the vessel. Components of the level measuring device can then contaminate the material, or the components may be corroded or otherwise damaged by the material. As a result of these problems, the presently preferred approach is to weight the contents of the vessel. This approach provides for much more precise and valuable information, and since the weighing devices are located outside the tank, the weighing devices do not come into contact with the materials being weighed. As a result, the weighing devices are not subject to the effects of corrosive or abrasive materials. Nor are these weighing devices affected by material density changes, rat holing or bridging of the material, or variations in the position of the material or the contour of its surface.

One conventional method of measuring the weight of the material inside a vessel is described in U.S. Pat. No. 4,064,744 to Kistler. The Kistler patent describes a weighing system for a vessel using a strain sensor that is mounted on a support leg for the vessel. When material is added to the vessel, the increased weight of the material will cause an added stress on the vessel leg. This increased stress causes a corresponding increase in strain of the vessel leg, which is then measured by a strain sensor. The increased strain measurement is then converted to a corresponding measurement of the increased weight of the material in the vessel. One advantage of the approach described in the Kistler patent is that it can be installed easily on existing vessels without require any repositioning of the vessel or modification of the vessel legs or the inlet/outlet piping or conduits of the vessel.

Although the approach described in the Kistler patent has significant advantages, its resolution and accuracy may be insufficient for some applications. More specifically, measuring the weight induced strain in the vessel legs requires substantial changes in the stress on the vessel leg. For a given strain sensing device, the sensitivity of the strain sensing device can be increased only by decreasing the cross-sectional area of the vessel legs, thereby increasing the strain imparted to the legs for a given weight. In some cases, adequate sensitivity can be achieved only by making the vessel legs undersized so that the weight of material added to the vessel causes a significant amount of stress and therefore strain in the vessel legs. However, most tank manufacturers design their vessel legs rather sturdily to protect against falling of the vessel in extreme cases of wind loading and /or earthquakes. Thus, in some cases the approach described in the Kistler patent cannot provide adequate sensitivity without using inadequately sized vessel legs.

Another problem with the approach described in the Kistler patent is that it can sometimes be difficult to install the strain sensing devices on the vessel legs. Since the sizes and shapes of vessel legs vary on different vessels, choosing the right installation spot for the strain sensor to provide an adequately high strain level can sometimes be challenging. As a result of the above-described difficulties, the accuracy levels that one can expect from a strain sensor weighing system is generally limited to less than 2% to 5% of the maximum total material weight in a vessel. For a lot of applications, this level of weighing accuracy is not acceptable.

The best method of measuring the weight of the material in a vessel is by actually measuring the weight of the vessel through installation of load cells under the vessel legs. Such a load cell is described in U.S. Pat. No. 5,313,022 to Piroozmandi et al. The Piroozmandi et al. load cell can measure load under both compression and tension and can provide a weighing accuracy of 0.1% or better.

To install a load cell under an existing vessel as described in the Piroozmandi et al. patent, the vessel must be raised to accommodate the height of the load cell. This will generally require modifications to the position of the vessel and to its inlet/outlet piping or conduits. If modification of piping systems on an existing vessels is not acceptable, the only other option is to cut the vessel leg in order to accommodate the height of the load cell. Either one of theses alternatives for instrumenting the vessel with load cells has significant limitations. Raising the height of the vessel to accommodate load cells in the vessel legs usually requires a crane to lift the vessel. For very heavy vessels, the cost of providing a crane can be considerable. Furthermore, in the case of vessels installed inside buildings, the clearance between the top of the vessel and the ceiling of the building may be insufficient to accommodate the increased height of the load cells. In these situations, it may not be possible to raise the vessel without cutting into the ceiling of the building to provide additional clearance. As a result of the above-described limitation of conventional vessel load measuring systems, there is a need for a load cell and installation technique that can be installed easily on existing vessels to provide highly accurate measurements of the weight of material in the vessel.

SUMMARY OF THE INVENTION

The inventive load measuring system measures the load carried by a support leg having a lower end positioned on a support surface. The load measuring system includes a load measuring device having an attachment structure fastened to the support leg, a support plate, and a load cell positioned between the attachment structure and the support plate. A lifting mechanism coupled between the support plate and the floor applies a sufficient upward force to the support plate to transfer the load carried by the support leg to the load cell. Although a variety of devices may be used, the lifting mechanism is preferably a plurality of threaded bolts projecting upwardly from the floor through respective holes in the support plate. The support plate rests on a plurality of support nuts threaded onto respective bolts. As a result, an upward force can be applied to the support plate to transfer the load to the load cell by rotating the support nuts. A securing nut may be threaded onto each of the bolts above the support plate to maintain the support plate in position on the support nuts. The attachment structure may be formed by a mounting plate, an attachment plate secured to the mounting plate perpendicularly to the mounting plate, and a fastening device securing the attachment plate to the support leg. The attachment plate may be the center web of an I-beam in which the I-beam abuts the upper surface of the mounting plate with the center web of the I-beam positioned adjacent one edge of the mounting plate. The load cell is preferably but not necessarily attached to the attachment plate by a single bolt extending through a hole in the attachment plate and threaded into a bore formed in the load cell. However, if the load cell is attached in this manner, the hole in the attachment plate is preferably oversized and a resilient member, such as a spring washer, is preferably positioned between a head of the bolt and the attachment plate so that the attachment plate can pivot relative to the load cell.

The load measuring device is preferably installed by attaching the load measuring device to the support leg at a location in which the load measuring device is substantially unloaded by the load carried by the support leg. A force is then applied between the load measuring device and the floor until substantially all of the load carried by the support leg has been transferred to the load measuring device. The force applied between the load measuring device and the floor is preferably sufficient to lift the lower end of the support leg above the floor. In the event that the load measuring device includes an attachment plate fastened to the support leg, a support plate, and a load cell positioned between the attachment plate and the support plate, the support plate may be spaced above the floor when the attachment plate is fastened to the support leg. The space between the support plate and the floor is preferably filled with a supporting material, such as concrete. In the event that multiple load measuring devices are installed on respective support legs, the load carried by each of the load measuring device is preferably monitored while the load is being transferred to the load cells to ensure that the loads carried by the load measuring devices are substantially equal.

DETAILED DESCRIPTION OF THE PREFERRED EMBODIMENT

Figure 1:
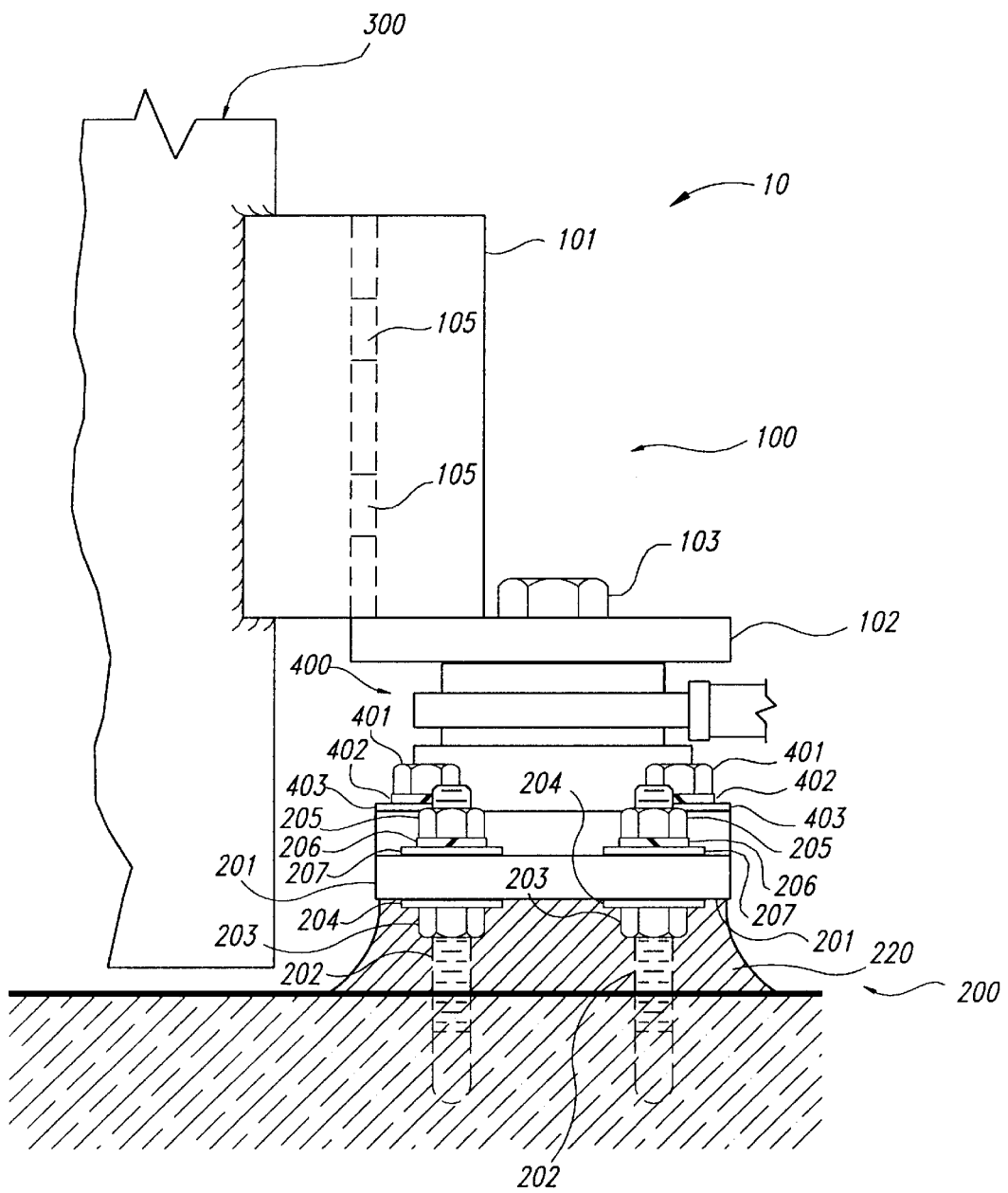
FIG. 1 is side elevational view of a preferred embodiment of the inventive load measuring system installed on a vessel leg.
Figure 2:
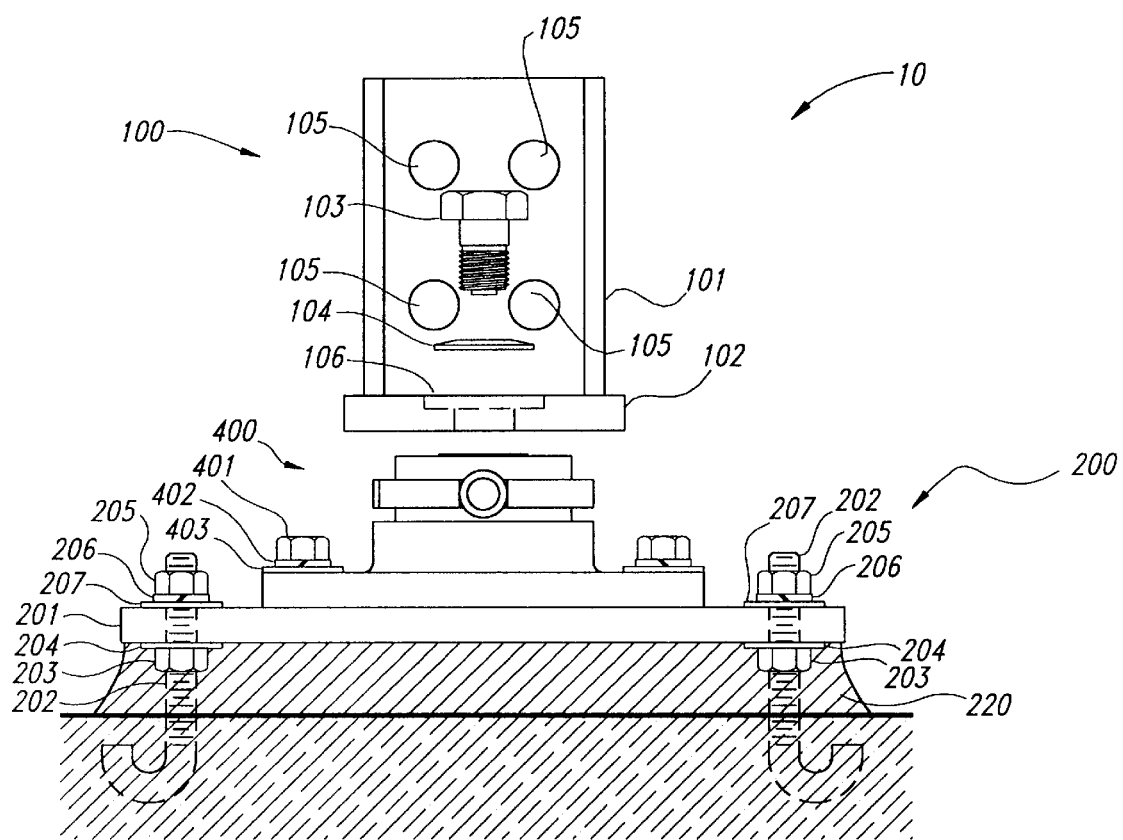
FIG. 2 is an exploded front elevational view showing the load measuring system of FIG. 1.
Figure 3:
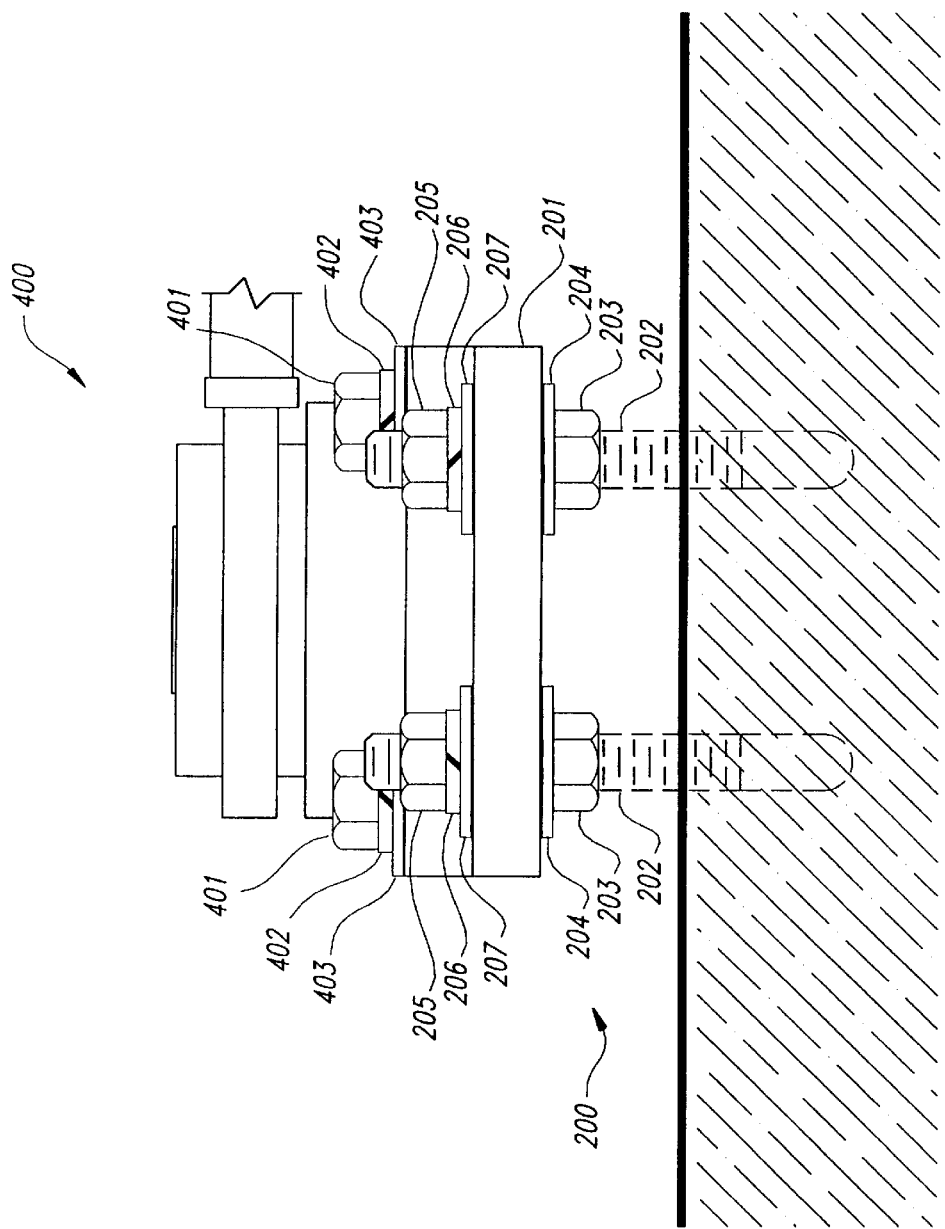
FIG. 3 is a side elevational view showing the manner in which the load measuring system of FIG. 1 is adjustably mounted on a supporting surface.
Figure 4:
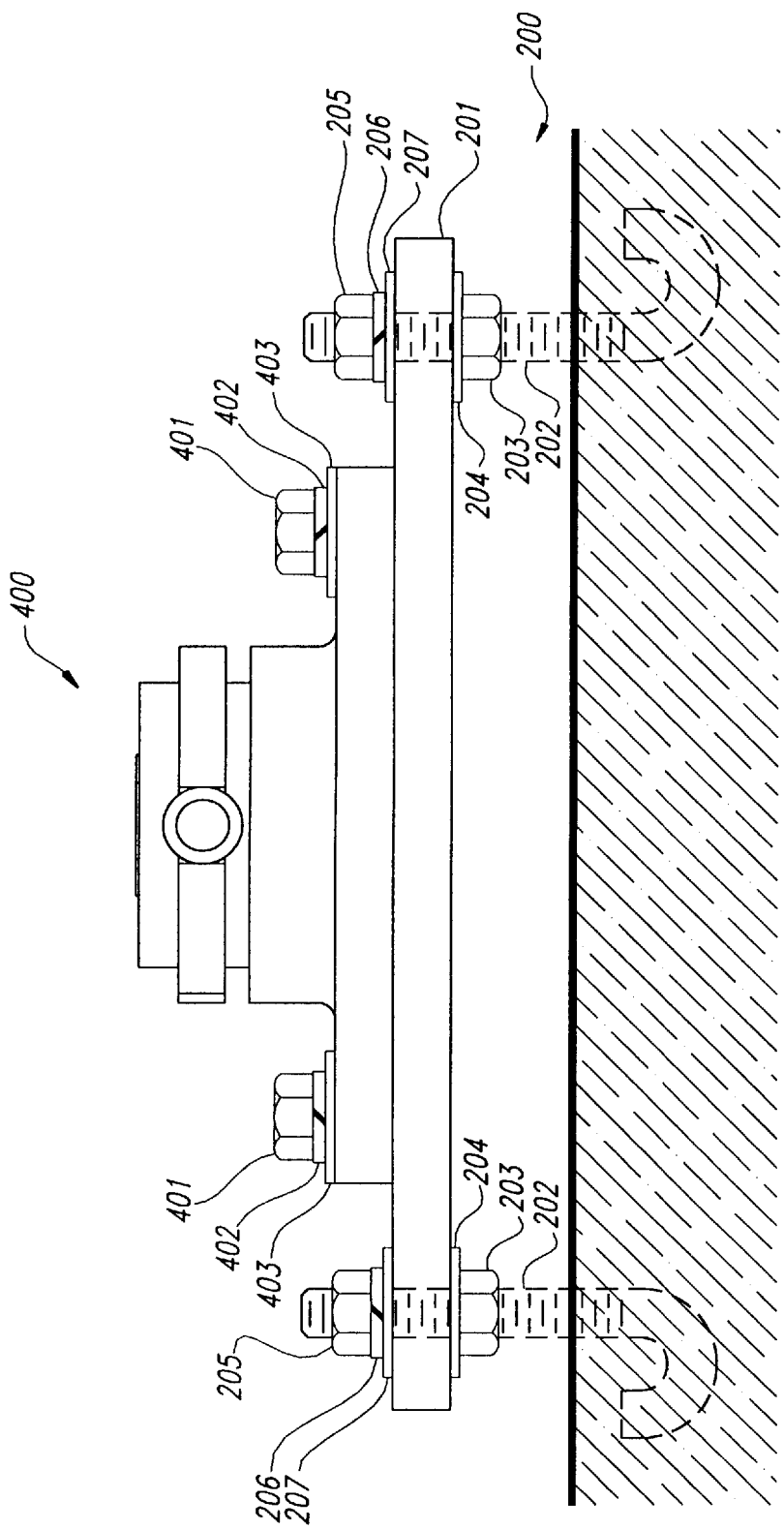
FIG. 4 is front elevational view showing the manner in which the load measuring system of FIG. 1 is adjustably mounted on a supporting surface.
Figure 5A:
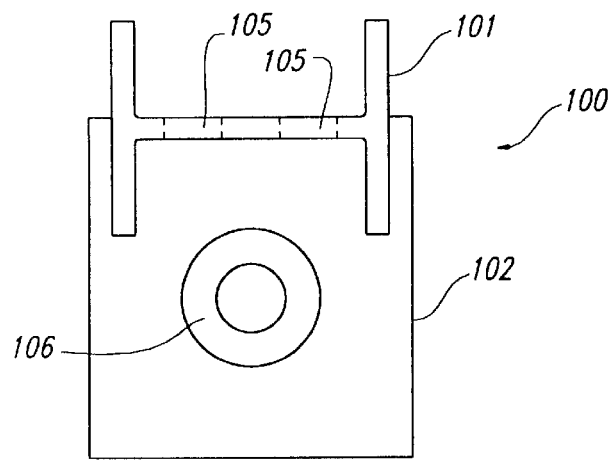
FIG. 5A is a top plan view of an attachment structure that may be used in the load measuring system of FIG. 1 for attaching the load measuring system to the vessel leg.
Figures 5B, 5C:
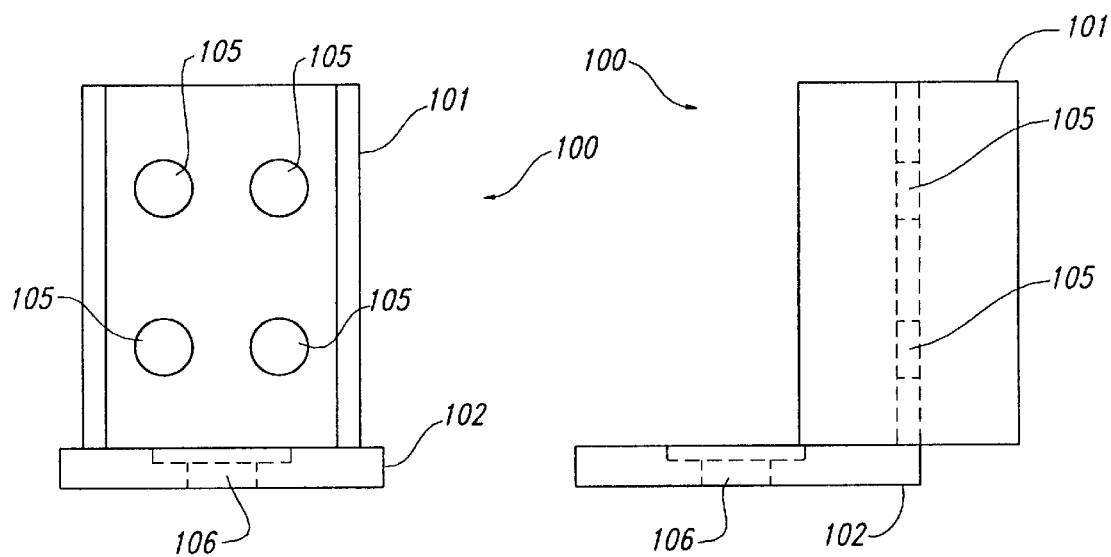
FIG. 5B is a front elevational view of the attachment structure shown in FIG. 5A.
FIG. 5C is a side elevational view of the attachment structure shown in FIG. 5A.

A presently preferred embodiment of the inventive load measuring system 10 is illustrated in FIGS. 1 and 2. The load measuring system 10 consists of two sections, namely a top section 100 and a bottom section 200. With further reference to FIGS. 5A–C, the top section 100 includes a flat rectangular attachment plate 102 having sufficient thickness and strength to avoid excessive deformation in use. A hole 106 is formed in the attachment plate 102, preferably at its center, as best illustrated in FIG. 5A. An I-beam section 101 is welded to an upper surface of the attachment plate 102, as best illustrated in FIG. 5C. The I-beam section 101 has several holes 105 formed on its web as best shown in FIG. 5B to facilitate attachment of the I-beam section 101 to a vessel leg 300 as shown in FIG. 1 and described in detail below.

With reference to FIGS. 1 and 2, the top section 100 also includes a bolt 103 extending through a spring washer 104 (FIG. 2) and into the hole 106 in the attachment plate 102. As best shown in FIGS. 5A–C, the hole 106 is formed with a stepped portion to receive the spring washer 104 so that the upper surface of the spring washer 104 is substantially recessed below the upper surface of the attachment plate 106. The diameter of the narrow portion of the hole 106 is preferably slightly larger than the diameter of the threaded portion of the bolt 103. As a result, the resiliency of the spring washer 104 allows the attachment plate 102 to pivot slightly, as described in further detail below and in U.S. Pat. No. 5,313,022 to Piroozinandi et al. which is incorporated herein by reference.

Figure 6:
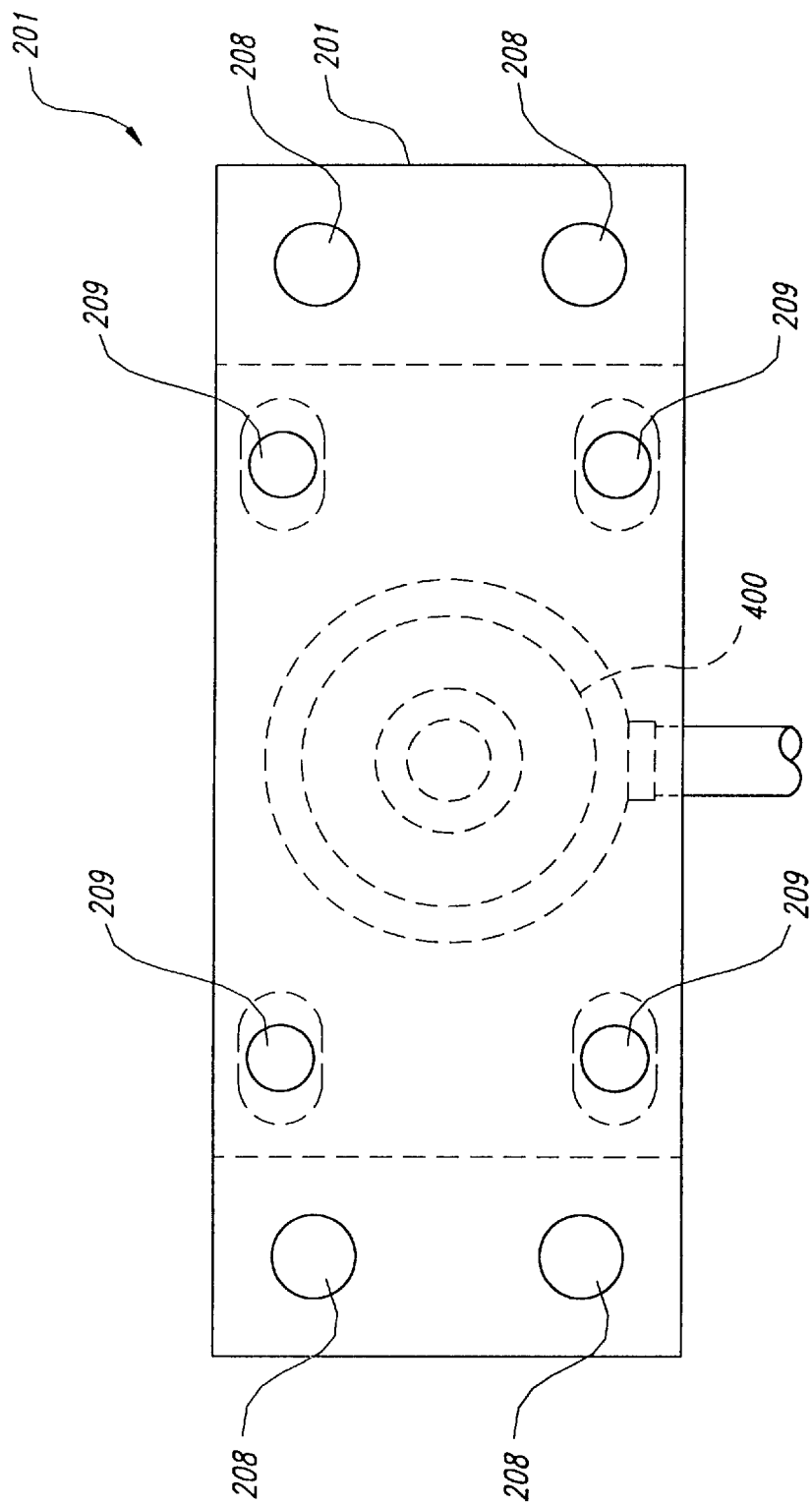
FIG. 6 is a top plan view showing the manner in which a load measuring device is mounted in the load measuring system of FIG. 1.

With further reference to FIGS. 1–4 and 6, the bottom section 200 includes a flat rectangular support plate 201 having a sufficient thickness and strength to avoid excessive deformation in use. A plurality of through holes 208 and a plurality of tapped holes 209 are formed in the support plate 201, as best illustrated in FIG. 6. With reference to FIGS. 1–4, the support plate 201 is supported on a supporting surface, such as a floor, by anchor bolts 202 extending through the holes 208 formed in the support plate 201. In the event that the floor is concrete, the lower ends of the anchor bolts 202 are preferable curved to strengthen the attachment to the concrete. The support plate 201 rests on leveling nuts 203 and respective flat washers 204. After the leveling nuts 203 have been adjusted as explained below, the flat support plate 201 is secured in position by nuts 205 threaded onto the upper ends of respective anchor bolts 202 above respective flat washers 207 and lock washers 206. Thus, the support plate 201 is spaced above the floor by a distance that may be adjusted by rotating the leveling nuts 203.

The magnitude of the load induced on the vessel leg 300 is measured by a load cell 400 of the type disclosed in U.S. Pat. No. 5,313,022 to Piroozmandi et al. As best illustrated in FIGS. 1–4 and 6, the load cell 400 may have a generally circumferential active portion attached to a rectangular mounting plate having a bolt hole at each corner. The load cell 400 is positioned on the upper surface of the support plate 201 and secured in place by respective bolts 401 extending through the bolt holes in the mounting plate of the load cell 400 and threaded into the tapped holes 209 in the support plate 201 shown in FIG. 6. The bolts 401 extend through respective flat washers 403 and lock washers 402.

Although the inventive load measuring system 10 described above has many innovative and advantageous features, one of the most important of these is the ability to easily, quickly and inexpensively install the load measuring system 10 on existing vessel support legs. In particular, the load measuring system 10 may be installed on existing vessel support legs without the need to use expensive equipment, such as cranes to lift the vessel and vessel support structure to install a load cell beneath the vessel support structure. Furthermore, there is no requirement that significant additional clearance be provided above the existing vessel, nor is it necessary to modify the vessel, vessel support structure, or conduits to the vessel in any manner.

The preferred embodiment of the inventive load measuring system 10 is installed on an existing vessel support leg as explained with reference to FIG. 1. A lower end of a vessel support leg 300 is initially resting on the floor rather than being spaced above the floor as shown in FIG. 1. The top section 100 is separated from the bottom section 200, and the top section 100 is then attached to the vessel support leg 300 by any suitable means. For example, the top section 100 may be attached to the vessel support leg 300 either by welding the I-beam section 101 to the support leg 300 or by bolting the I-beam section 101 to the support leg 300 using bolts placed through the bolt holes 105 (FIGS. 1 and 2). The top section 100 should be fastened to the support leg a sufficient distance above the floor to allow for the bottom section 200 to be positioned between the top section 100 and the floor.

Next, the load cell 400 is fastened to the support plate 201 by four sets of bolts 401, lock washers 402, and flat washers 403, as explained above. This assembly of load cell 400 and support plate 201 is then fastened to attachment plate 102 by the bolt 103 and spring washer 104. Specifically, the bolt 102 extends through the hole 106 in the attachment plate 102 and engages a threaded bore formed in the load cell 400.

After the lower section 200 has been attached to the upper section 100, the vertical projection of the holes 208 in the support plate 201 are marked on the floor. The anchor bolts 202 are then installed on the floor at the marked locations in a conventional manner, as shown in FIG. 1 and 2. Installation of the anchor bolts 202 will generally require the lower section 200 to be unfastened from the upper section 100 during the installation to provide sufficient clearance beneath the lower section 200. However, if there is sufficient clearance beneath the lower section 200, it may be possible to install the anchor bolts 202 with the lower section 200 remaining attached to the upper section 100. In such case, the anchor bolts 202 should be installed so that they project through the holes 208 in the support plate 201. Regardless of whether or not the lower section 200 is removed during installation of the anchor bolts 202, the length of the anchor bolts 202 should be sufficient so that the upper end of the bolts 202 are positioned well above the upper surface of the support plate 201 when the second section 200 is attached to the first section 100.

After the anchor bolts 202 have been installed in the floor, the leveling nuts 203 and flat washers 204 are installed on the anchor bolts 202 all the way down to the floor. Assuming that the lower section 200 was disconnected from the upper section 100 during the installation of the anchor bolts 202, the support plate 201 is then installed on the anchor bolts 202 with the lower surface of the support plate 201 resting on the flat washers 204 and leveling nuts 203. To provide sufficient clearance for the lower section 200 beneath the attachment plate 102, it will be necessary to remove the load cell 400 from the support plate 201 before placing the support plate 102 over the upper ends of the anchor bolts 202. After the support plate 201 is in position with the anchor bolts 202 extending through the holes 208, the load cell 400 is reattached to the support plate 201. Prior to reattaching the load cell 400, the support plate 201 can be raised so that load cell 400 abuts the lower surface of the attachment plate 102 by rotating the leveling nuts 203, if desired. If the lower section 200 remained connected to the upper section during installation of the anchor bolts 202, then the leveling nuts 203 and flat washers 204 must be placed on the anchor bolts 202 prior to installing the anchor bolts 202 and placing their ends through the holes 208 in the support plate 201.

Once the load cell 400 is fastened to the attachment plate 102 by the bolt 103, the leveling nuts 203 are rotated several more turns to raise the vessel support legs 300 a slight distance above the floor. During this operation, all of the weight of the vessel is transferred from the lower end of the support legs 300 to the load measuring system 10 so that the load cell 400 receives the entire portion of the vessel's weight that supported by the support leg 300. A load measuring system 10 is preferably mounted on each support leg 300 of the vessel to ensure optimum accuracy. However, if less accuracy can be tolerated or the vessel load is well balanced on all of the support legs 300, it may not be necessary to mount load measuring systems 10 on all of the support legs 300.

If multiple load measuring systems 10 are mounted on the legs support 300, the output of the load cell 400 of each load measuring system 10 is monitored while the leveling nuts 203 are turned on the anchor bolts 202 to adjust the height and therefore load distribution on each load cell 400. After the load distribution has been equalized (or, in the case of a single load measuring system installation, after the support leg 300 has been raised from the floor), the flat washers 207, lock washers 206 and nuts 205 are installed on respective anchor bolts 202 on top of support plate 201 to secure the plate 201 in position in the presence of strong side loads.

The final installation step is to pack concrete 220 or other supporting material under the support plate 201 to permanently support the load measuring system 10, as shown in FIGS. 1 and 2. The distribution of the load carried by all of the load cells 400 is preferably monitored during this process to ensure that the equalization of the load has not been compromised.

It is thus seen that the inventive load measuring system provides a highly accurate measurements of the weight of material in a storage vessel or the like. Moreover, the load measuring system can be easily, quickly and inexpensively installed on existing structures without the need to use expensive equipment, or to modify the vessel itself, a building in which the vessel is housed, the vessel support structure, or conduit extending to the vessel. From the foregoing, it will be appreciated that, although specific embodiments of the invention have been described herein for purposes of illustration, various modifications may be made without deviating from the spirit and scope of the invention. Accordingly, the invention is not to be limited except as by the appended claims.

I claim:

1. A load measuring system for measuring the load carried by a support leg having a lower end positioned on a supporting surface, the load measuring system comprising:
   an attachment structure fastened to the support leg;
   a support plate;
   a load cell positioned between said attachment structure and said support plate; and
   a lifting mechanism coupled between the support plate and the supporting surface to apply a sufficient upward force to the support plate to transfer the load carried by the support leg to the load cell, said lifting mechanism comprising:
   plurality of threaded bolts projecting upwardly from the supporting surface through respective holes in said support plate; and
   a lifting nut threaded onto each of said bolts, said lifting nuts having upper surfaces contacting said support plate and applying a sufficient upward force on said support plate so that substantially the entire load carried by the support leg is coupled to said load cell by said attachment structure and said support plate.

2. The load measuring system of claim 1 further including a securing nut threaded onto each of said bolts above said support plate, said securing nuts having respective lower surfaces contacting an upper surface of said support plate to maintain said support plate in position on said lifting nuts.

3. The load measuring system of claim 1 wherein said lifting nuts position said support plate a sufficient distance above the supporting surface that said support leg is spaced above the supporting surface.

4. A load measuring system for measuring the load carried by a support leg having a lower end positioned on a supporting surface, the load measuring system comprising:
   a mounting plate having a generally rectangular configuration in plan view;
   an attachment plate secured to said mounting plate with said attachment plate perpendicular to said mounting plate;
   a fastening device securing said attachment plate to said support leg;
   a support plate;
   a load cell positioned between said attachment structure and said support plate; and
   a lifting mechanism coupled between the support plate and the supporting surface to apply a sufficient upward force to the support plate to transfer the load carried by the support leg to the load cell.

5. The load measuring system of claim 4 wherein said attachment plate comprises the center web of an I-beam.

6. The load measuring system of claim 5 wherein said I-beam is secured to said mounting plate with said I-beam abutting an upper surface of said mounting plate and the center web of said I-beam positioned adjacent one edge of said mounting plate.

7. The load measuring system of claim 4 wherein said fastening device comprises a plurality of bolts each of which extends through aligned bores in said attachment plate and said support leg.

8. The load measuring system of claim 4 wherein said fastening device comprises a weld between said attachment plate and said support leg.

9. The load measuring system of claim 4 wherein said load cell has formed in its upper surface a threaded bore, and wherein said load cell is attached to said mounting plate by a bolt extending through a hole in said mounting plate and threaded into said bore.

10. The load measuring system of claim 9 wherein the hole in said mounting plate has a diameter that is sufficiently larger than the diameter of said bolt that said bolt is spaced apart from the wall of said hole, and wherein said load measuring system further includes a spring washer through which said bolt extends, said spring washer being positioned between a head of said bolt and said mounting plate so that said mounting plate can pivot relative to said load cell.

11. A method of installing a load measuring device having an attachment plate on a support leg to measure a loan carried by a support leg, said support leg having a lower end positioned on a supporting surface, said method comprising:
    attaching said load measuring device to said support leg at a location in which said load measuring device is substantially unloaded by the load carried by said support leg, said step of attaching said load measuring device to said support leg comprising welding said attachment plate to said support leg; and
    applying a force between said load measuring device and the supporting surface until substantially all of the load carried by said support leg has been transferred to said load measuring device.

12. A method of installing a load measuring device having an attachment plate on a support leg to measure a loan carried by a support leg, said support leg having a lower end positioned on a supporting surface, said method comprising:
    attaching said load measuring device to said support leg at a location in which said load measuring device is substantially unloaded by the load carried by said support leg, said step of attaching said load measuring device to said support leg comprising bolting said attachment plate to said support leg; and
    applying a force between said load measuring device and the supporting surface until substantially all of the load carried by said support leg has been transferred to said load measuring device.

13. A method of installing a load measuring device on a support leg to measure a loan carried by a support leg, said support having a lower end positioned on a supporting surface, said load measuring device including an attachment plate, a support plate, and a load cell positioned between said attachment plate and said support plate, said method comprising:
    attaching said load measuring device to said support leg at a location in which said load measuring device is substantially unloaded by the load carried by said support leg,
    said step of attaching said load measuring device to said support leg comprising fastening said attachment plate to said support leg, and wherein said step of applying a force between said load measuring device and the supporting surface comprises applying an upward force to said support plate from said supporting surface; and
    applying a force between said load measuring device and the supporting surface until substantially all of the load carried by said support leg has been transferred to said load measuring device.

14. The method of claim 13 wherein said step of applying an upward force to said support plate from the supporting surface comprises lifting said support plate until said support plate is spaced above the supporting surface by a sufficient distance that the lower end of the support leg is positioned above the supporting surface.

15. The method of claim 14 further comprising the step of filling the space between said support plate and the supporting surface with a supporting material.

16. The method of claim 13 wherein said step of attaching said load measuring device to said support leg comprises attaching said load measuring device to said support leg with said support plate spaced above the supporting surface.

17. The method of claim 13 wherein said step of applying an upward force to said support plate from said supporting surface comprises:

mounting a plurality of upwardly projecting threaded bolts in said supporting surface;

threading a lifting nut on each of said bolts;

placing said support plate on said lifting nuts with said bolts projecting through respective holes in said support plate; and rotating said lifting nuts to displace said support plate upwardly away from said supporting surface.

18. The method of claim 17 further comprising the step of filling the space between said support plate and the supporting surface with a supporting material.

19. The method of claim 18 further comprising the step of monitoring the load carried by said load measuring device while the space between said support plate and the supporting surface is being filled with said supporting material.

20. The method of claim 17 further comprising the step of threading a securing nut on each of said bolts after said support plate has been placed on said lifting nuts.

* * * * *